United States Patent [19]

Speer

[11] 3,975,558

[45] Aug. 17, 1976

[54] METHOD FOR REPAIRING PLASTIC-LIKE MATERIALS

[76] Inventor: Lawrence Speer, 4380 Inner Circle Drive, Brunswick, Ohio 44212

[22] Filed: Feb. 20, 1975

[21] Appl. No.: 551,084

[52] U.S. Cl. .................................. 427/140; 156/94; 427/274
[51] Int. Cl.² ......................................... B32B 35/00
[58] Field of Search .......... 427/140, 256, 284, 274, 427/277; 428/912; 156/94, 98; 241/28

[56] References Cited
UNITED STATES PATENTS

| | | | |
|---|---|---|---|
| 3,620,865 | 11/1971 | Golumbic | 156/98 |
| 3,713,926 | 1/1973 | Speer | 156/98 |
| 3,804,685 | 4/1974 | Jacoby | 156/98 |
| 3,810,801 | 5/1974 | Speer | 156/94 |
| 3,887,413 | 6/1975 | Speer | 156/94 |

Primary Examiner—Thomas J. Herbert, Jr.
Assistant Examiner—Bruce H. Hess

[57] ABSTRACT

A heat-activated process for forming a patch for plastic and leather-like materials employs a protective coating around the patched area to avoid damage due to the heating step. The protective coating cures to form a continuous insulating sheet prior to the heating step and is easily removable at the conclusion of that step.

9 Claims, No Drawings

METHOD FOR REPAIRING PLASTIC-LIKE MATERIALS

FIELD OF THE INVENTION

This invention relates to methods for repairing damages in materials such as plastics and leather and the like.

BACKGROUND OF THE INVENTION

Attention has been directed, in the past to the patching of materials which are secured in place such as is the case with upholstered furniture and billiard table cloth. The incentive for such attention, of course, arises not only because of the high cost of replacement of the material involved, but also because of frequent inability to obtain identical replacement material and because of the high cost of labor.

There is a variety of prior art techniques for repairing such materials in situ. Most require an adhesive backing material for forming a void into which cementitious material including fibers to match the repaired material is disposed. In some techniques, laminate patches are preformed to be cemented into place. Such techniques are perhaps adequate for fabrics which are secured in place as, for example, billiard table cloths, where little movement of the repaired material is possible. Experience, on the other hand, indicates that such techniques are not well suited for materials which are intended for movement under pressure as is the case with upholstered furniture.

The failure of prior art techniques is particularly apparent with plastic materials such as leatherettes and, of course, leather which the plastics so closely imitate. These make repairs obvious, but are intended to stretch in use thus taxing the structural capabilities of any patch with less flexible properties.

In my U.S. Pat. No. 3,713,926 issued Jan. 30, 1973, I disclose a plastic repair procedure in which a plastic film forming material, in paste form, is applied to a damaged area in a plastic material and covered with graining paper. The graining paper functions, with the surrounding undamaged portion of the plastic and with an adhesive backing material, to form the damaged area into a mold in which the paste is cured in situ in the presence of heat. The heat is supplied by a flat hot surface applied to the graining paper. The surface functions to compress the mold as it cures the patch.

A problem arises when the flat hot surface is pressed against the patch. If the flat hot surface is defined by the face of a familiar household iron, the iron is, typically, sufficiently large to extend beyond the typical piece of graining paper and the iron frequently removes the graining from the formerly undamaged material surrounding the patch and beyond the graining paper. This undesirable result can occur, at sufficiently high temperatures frequently realized with an iron, even through the graining paper. Further, different types of plastics react differently to heat. Some may melt irreversibly when exposed to the flat hot surface even at relatively low temperatures. This too can occur through the graining paper though perhaps at a higher temperature.

One solution to this problem is to employ a small special iron to avoid heating large areas of the undamaged material and, in addition, to move the iron with respect to the vinyl release (graining) paper. Indeed, repair kits, presently being sold, include soldering irons with disc-like tips which provide heat over a circular area of about an inch, well within the confines of the typical graining paper. With a little practice, very successful patches are achieved by movement of an instrument of this type with respect to the graining paper. But such an instrument is expensive, particularly if it includes a thermostat to regulate the temperature of the tips to an acceptable 300°–350°F. Unregulated household irons, on the other hand, when plugged in, increase in temperature relatively quickly to a sufficiently high temperature to cause discoloration of the undamaged plastic. Of course, the graining paper, commonly called "vinyl-release" paper, is opaque and does not allow visual inspection of the curing process. Accordingly, it is difficult to guard against discoloration. Frequently, a perfect patch is formed in the middle of an area of discoloration.

The special iron sometimes avoids the discoloration problem for the most part particularly as long as the iron is moved quickly with respect to the graining paper and the heat from iron is perfectly regulated.

In my copending application Ser. No. 386,345, filed Aug. 7, 1973 now Pat. No. 3,887,413, the undamaged material surrounding a damage to be repaired by a heat responsive, plastic repair procedure is preconditioned to avoid damage, resulting from contact with the requisite hot flat surface which cures the patch, whether or not a special iron is used. Preconditioning is achieved by applying a paste comprising a mixture of Bentonite and talc (both clay derivatives) in water onto the undamaged material around the damage prior to filling the damaged area with the repair forming paste. The preconditioning paste insulates the plastic from the heat of the iron and allows a patch to be cured in situ without discoloration or loss of graining even if the flat, hot surface remains unmoved against the protected undamaged plastic during the patch curing process.

Although the paste avoids the previously described problems of discoloration and the necessity of a special iron, the paste is difficult to remove and has a tendency to attack the graining paper thus limiting the use of that paper to a single repair. Moreover, unless care is taken the insulating paste may be moved into the damaged area by the movement of the iron. If this occurs, the patched area can be ruined since the paste prevents proper curing if it is moved into the damaged area during the curing process.

BRIEF DESCRIPTION OF THE INVENTION

The present invention is directed at a vinyl repair process in which a vinyl release (graining) paper is employed to emboss a paste patch being cured by heat applied through the paper. In accordance with the present invention, an insulating paste layer is spread around the area to be repaired. But, in this instance the insulating paste comprises a material which cures (via a catalyst) to form a film which serves as an insulating layer during a later heating step yet releases both the repair patch and the vinyl release paper. In one embodiment, the insulating material comprises a polyester vinyl resin mixed with a catalyst comprising B.P.O. (benzoyl peroxide).

DETAILED DESCRIPTION

The class of materials under consideration are plastics and leather. Inasmuch as plastics have been made indistinguishable from leather, plastic repairs in accordance with this invention are completely adaptable to the latter.

Plastic films are available commercially both with and without a backing material which imparts to the plastic some resistance to damage. Better grade plastics not only are thicker gauge but are backed by such backing materials which impart the qualities of genuine leather to the plastic particularly when the plastic is embossed to imitate a leather grain. This embossing of the plastic is accomplished by a vinyl release or graining paper which is rolled over the plastic yard goods and heated under pressure therewith during manufacture. It is contemplated to employ both a backing material and the release paper in the practice of the method of this invention.

In the repair of a leather-like material, the damaged area conveniently is trimmed to remove loose or shredded material. Then a backing material is placed behind the area to be patched. Since the material is usually on an upholstered piece of furniture, the stuffing beneath the damaged area is sufficient to retain the backing material in place. On the other hand, the backing material may be glued to the underside of the damaged material by any convenient adhesive.

In accordance with the present invention, the surface of the material to be repaired is coated, by means of a spatula, with a paste which forms a plastic film when cured. The resulting film, of course, when cured is grained by the graining of the material on which it is spread. Typically, a polyester vinyl resin is used for this purpose. Such a material is commonly used to make plastic molds and has good release properties. The resin is mixed in, for example, a paper cup with a suitable catalyst such as B.P.O. in the ratio of five parts resin to one part catalyst by volume. The catalyst causes the resin to cure in about fifteen minutes. Both the resin and the catalyst are available commercially from, for example, Reichold Chemical Corporation.

A filler such as cotton flock or cabosil is mixed with the resin to provide a paste consistency before the catalyst is added. An alternative to the resin is silicone rubber, known as RTV (room temperature vulcanizing) and is available from the General Electric (G.E.) Corporation. The rubber already has a paste consistency. The rubber is mixed with a catalyst such as special RTV catalyst Nvo octacte supplied by G.E. and is applied to the surface of the damaged material just as the paste of resin and catalyst. The rubber cures somewhat faster than the resin but is more costly.

In either case, the paste cures to form a film, grained as is the material to be repaired, which film is an insulating and continuous film over the area of that material surrounding the damaged area. The insulating film of course does not cover the damaged area, the paste being applied only to the area about the damage and away from the damage by a small distance later covered by the graining paper.

The void formed by the undamaged material and the backing material is then filled with a patching compound after the insulating film is cured. A graining paper is thereafter placed over both the patching compound and (at least some of) the film coated material. A household iron is then placed over the damaged area. The heat of the iron cures the patching compound while the weight of the iron presses the grain of the graining paper into the surface of the curing patch. The insulating film extending under and beyond the graining paper prevents the heat of the iron from discoloring or otherwise damaging the repaired material. Since the insulating film is already cured when the heating step is carried out, there is no risk of moving heat insulating paste into the area of the damage.

The procedure is completed by removing the iron and the graining paper. The insulating film thereafter is removed (peeled off) in the same simple manner as is the graining paper. The grain of the area around the repair is unimpaired in any way because the insulating film covering that area is grained by that material while it was curing and the (thus grained) insulating film later protects the original material from the heat of the iron for a period of considerably longer than necessary to cure the patch.

Although the insulating films described have excellent release properties, the surface of the material to be repaired may be sprayed with silicone prior to the spreading of the insulating, film-forming paste thereon. Of course, care must be taken to avoid applying silicon to the damaged area since this might reduce the tenacity of the patch. The silicone enhances the release properties.

Although the insulating paste, the polyester resin for example, does not attack the graining paper at all, the film formed by that resin, when cured, cannot be used in a second repair procedure because the grain embossed into the insulating film while curing may not match the grain about a damage in a second material to be repaired. The insulating film has to be formed in situ. The formation of an insulating film in situ from a paste is considered an important feature of the procedure of this invention.

The use of an insulating, film-forming paste to eliminate the critical timing problem in the heating step of plastic repair procedures in accordance with this invention allows the repair procedure to be applied to what are called "expandable" or "soft" vinyls which are in widespread use in industry today. These vinyls are called expanded because they are formed during the manufacturing process and have tiny air pockets in them as a result. This type of vinyl is particularly sensitive to heat and thus burning or discoloration of the area around a patch is common. Moreover, these vinyls are typically thicker than conventional vinyls. Consequently, a relatively large amount of patching compound must be used and an equally greater amount of heat is necessary to cure the patch. Only with extreme care and a special heating tool have completely successful patches been made in expanded vinyls with prior art procedures. With film-forming, insulating paste as described herein, expanded vinyls are easily repaired.

The use of a film-forming, insulating paste is particularly advantageous in repairing automobile vinyl tops also. In applications of this type, the metal car roof under the vinyl acts as a heat sink requiring additional heat to cure the patching material. A film forming, heat insulating paste applied to a damaged area in such a roof allows as much heat to be applied as is necessary without discoloration and without the necessity of special equipment hitherto necessary to effect such a repair.

Vinyl or leather surfaces repaired in accordance with this invention are virtually indistinguishable from like undamaged vinyl or leather. The reason for this is not only because a like vinyl film is formed and that surface textures can be duplicated but also because a large number of coloring materials are available. In practice, virtually any original material color can be duplicated. If color matching of the patch to the original material is a problem because of fading, for example, a piece of the original material taken, for example, from the bottom of a chair to be repaired can be used to provide the correct coloring. The material is dissolved in a chemical solvent such as tetrohydro furon (THF) which melts the polyvinyl chloride of the original material into a colored liquid. This liquid is added to the plastisol of the patching compound to give the exact color to the patch.

My aforementioned patent describes the patching compound in detail. One example is repeated here for convenience. Specifically, a polyvinyl chloride acetate (viz: a finely divided resin), 70% by weight is mixed with a plasticizer such as diethylhexyl pthalate, 30% by weight to form a film-forming paste.

What is claimed is:

1. A process for repairing a damage in plastic or leather-like materials in which a heat-curable film-forming patching compound is applied to the damage, covered by a graining paper and heated therethrough with a flat hot surface at a temperature and for a time to cure the patching compound, including the steps of coating the undamaged material around said damage with a heat-insulating paste comprising materials which cure in the presence of a catalyst to form a heat insulating film, curing said heat insulating paste, and then adding said patching compound.

2. A process in accordance with claim 1 in which said paste includes a polyester vinyl resin.

3. A process in accordance with claim 2 wherein a filler is added to said resin.

4. A process in accordance with claim 3 wherein said filler comprises cotton flock.

5. A process in accordance with claim 3 wherein said filler comprises cabosil.

6. A process in accordance with claim 3 in which a catalyst is mixed with said filler and resin to effect the curing of said paste.

7. A process in accordance with claim 6 wherein said catalyst comprises benzoyl peroxide.

8. A process in accordance with claim 1 wherein said heat insulating paste comprises silicone rubber.

9. A process for repairing a damaged area in plastic or leather-like materials comprising the steps of placing a backing material behind said damaged area, spreading a curable film-forming heat-insulating paste including a catalyst over the surface of the material to be repaired leaving uncovered the area thereof immediately around the damage, curing said heat-insulating paste applying a heat-curable film-forming patching compound to the damaged area after said heat-insulating paste is cured, covering the patching compound with a vinyl-release graining paper and applying a flat hot surface to heat the patching compound through the graining paper for a time and at a temperature to cure the patching compound.

* * * * *